Nov. 8, 1949     R. E. LINDEMANN     2,487,153
APPARATUS FOR MAKING BELTS
Filed July 12, 1946     2 Sheets-Sheet 1
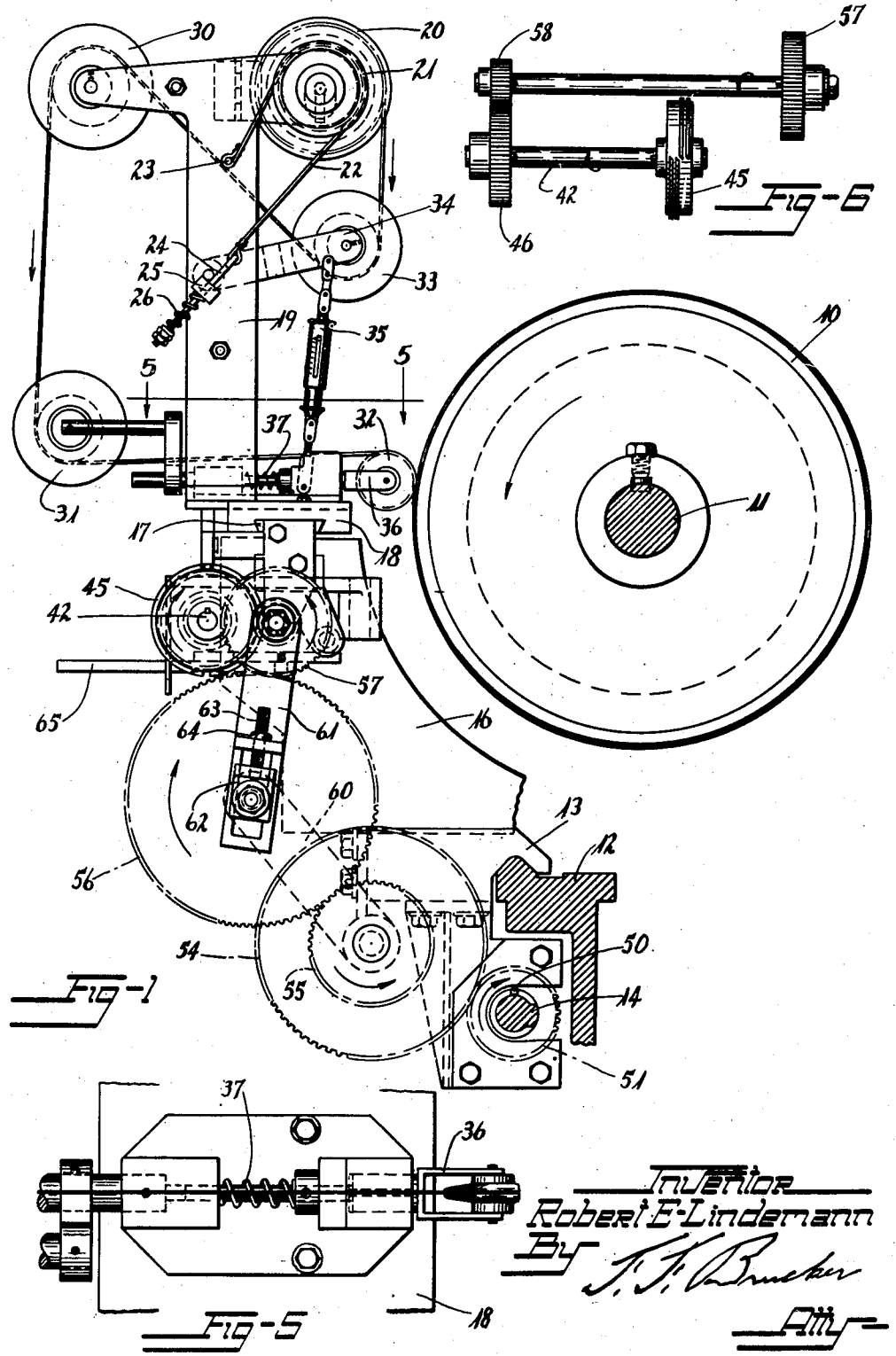
Inventor
Robert E. Lindemann

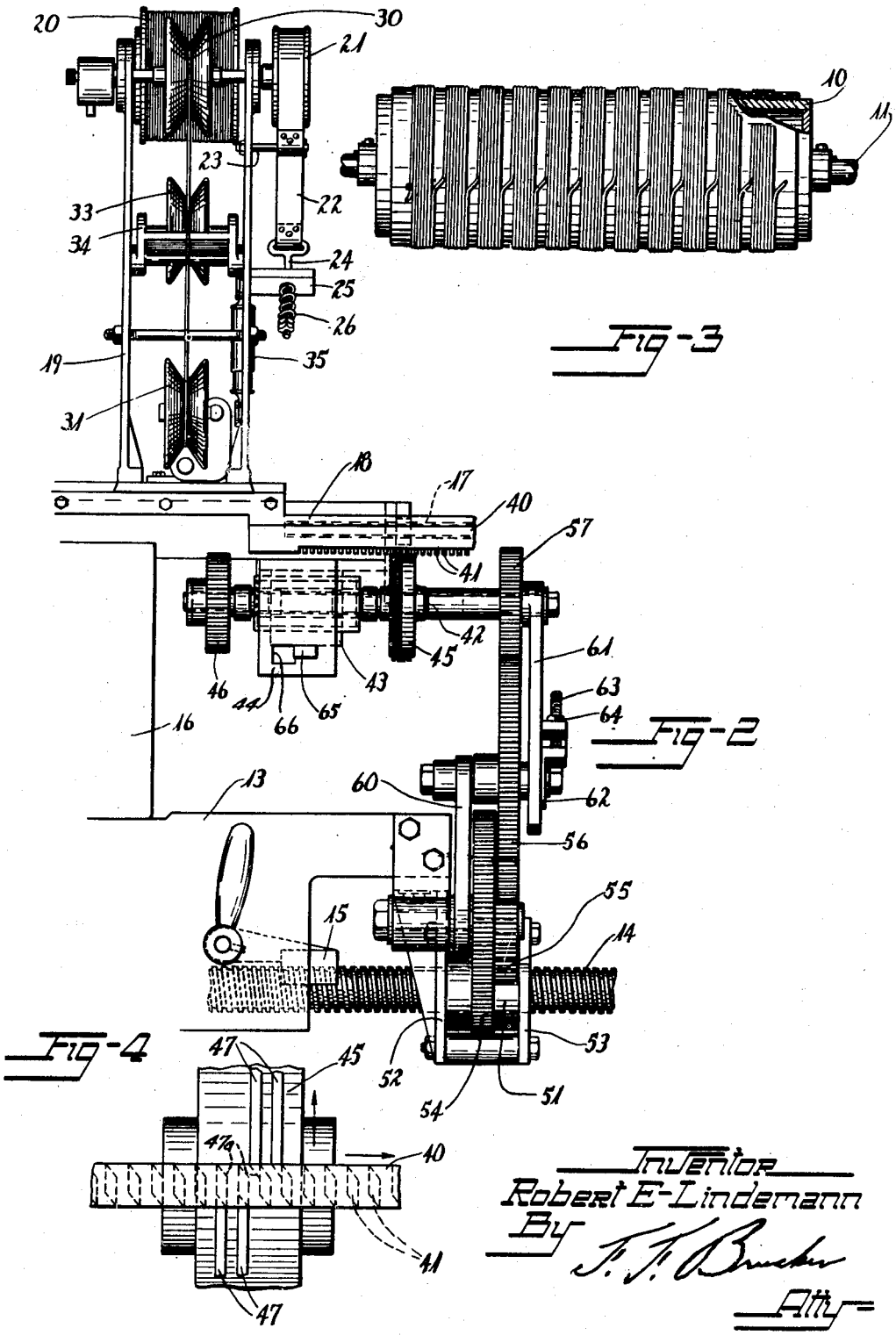

Patented Nov. 8, 1949

2,487,153

UNITED STATES PATENT OFFICE 2,487,153

APPARATUS FOR MAKING BELTS

Robert E. Lindemann, Barberton, Ohio, assignor to The B. F. Goodrich Company, New York, N. Y., a corporation of New York Application July 12, 1946, Serial No. 683,274

3 Claims. (Cl. 242—7)

This invention relates to the manufacture of endless belts and is especially useful in the manufacture of a narrow belt having a winding of circumferentially extending tension members.

In the manufacture of narrow endless belts such as V-belts, it has been proposed to wind sheet material upon a collapsible drum and then to wind cord, wire, or other substantially inextensible reinforcing material thereon under tension in successive convolutions, the cylinder of composite material being then cut circumferentially to provide endless belt structures.

It is an object of the present invention to provide for positively winding the reinforcing elements in groups of convolutions, the groups being separated by space such that a substantially unreinforced portion of the cylinder of material is provided capable of being readily separated between individual belt articles with exposure at the plane of separation of a minimum amount of reinforcing material. A related object is to provide for shifting the course of the cord abruptly as a group of convolutions is completed.

Other objects are to provide uniformity of spacing, positive guiding of the reinforcing elements, and uniform tensioning of the reinforcing material.

These and other objects will appear from the following disclosure and the accompanying drawings.

Of the drawings,

Fig. 1 is an end elevation, partly in section of apparatus constructed in accordance with and embodying the invention, parts being broken away.

Fig. 2 is a front elevation thereof, parts being broken away.

Fig. 3 is a detail view of a winding drum with belt material thereon, the material being broken away and in section.

Fig. 4 is a detail view of the spacing mechanism.

Fig. 5 is a detail view of the feed roller and its holder.

Fig. 6 is a detail view of the spacing cam and its drive gearing.

Referring to the drawings, the numeral 10 designates a collapsible building drum supported by an arbor 11 mounted in an engine lathe. The lathe has the usual ways 12, carriage 13 and lead screw 14. The lead screw is driven at any desired speed with relation to rotation of the mandrel by means of the usual change gears or gear box, not shown, to feed the carriage along the ways. A driving half-nut 15 is pivotally mounted on the carriage 13 and may be thrown into or out of engagement with the feed screw for propelling the carriage along the ways or for stopping such movement.

For supporting the cord feeding mechanism, a pedestal 16 is mounted on the carriage and has a dove-tailed guideway 17 formed on its upper face and extending parallel to the ways. A block 18 is formed to slide on guideway 17 and supports a reel support 19. The reel support has a reel 20 for supporting a supply of cord. A brake drum 21 may be secured to the reel and is engaged by a brake band 22, one end of which is secured to the reel support, as at 23, and the other end of which is secured to a tension bolt 24. Bolt 24 passes through a lug 25 on the reel support and a coil spring 26 thereabout provides an adjustable tension force.

Reel support 19 also rotatably supports guide rollers 30, 31, 32 and 33 of groove form. Guide roller 33 is mounted on a swing frame 34. A spring balance 35 is connected between the swing frame and the block 18 to indicate the amount of tension on the cord. Guide roll 32 is mounted for movement toward and away from drum 10 and for this purpose a fork 36 supports the wheel and has its shank slideably mounted in block 18. A coil spring 37 urges the guide wheel against the drum 10 to correct any eccentricity of the drum.

So far, the apparatus described could be used for laying a cord in convolutions of uniform spacing entirely across the drum. The invention contemplates a departure from such an arrangement of convolutions by spacing consecutive groups of convolutions at regular intervals by an abrupt shift of the course of the winding. For this purpose, a rack 40 having uniformly spaced teeth 41 is secured to block 18 and extends parallel to the lead screw 14. A shaft 42 is mounted for rotation in a bearing 43 secured in a box 44 mounted on pedestal 16. A cam drum 45 and a gear wheel 46 are fixed to shaft 42. Cam drum 45 has four cams 47 fixed thereto. Each cam extends through substantially 180° of movement of the cam and has oblique ends 47a adapted to engage oblique ends of the rack teeth 41. The cams are of a width equal to that of the spaces between the rack teeth and are spaced axially of the drum in groups of two cams with a lateral face of the groups in one plane of revolution. The arrangement is such that at each 180° revolution of the cam drum 45 the rack is positively moved abruptly to the right in Fig. 4 one tooth and is then positively locked against movement for substantially half a revolution of the cam.

For continuously rotating the cam drum regardless of the position of the carriage along the ways, the lead screw 14 has a key-way 50 continuously thereof. A gear 51 is rotatably mounted on the top of the threads of the lead screw and has a feather key to engage the key-way. The gear 51 is retained between apertured brackets 52, 53 carried by the carriage 13 and is adapted to clear the threads of the screw 14 for sliding movement therealong. A train of gears 54, 55, 56, 57, 58 are rotatably supported from the carriage and the cam drum 45 is driven through such train from the gear 51. Gears 55, 56, 57 may be changed to provide any desired ratio between the revolution of the screw 14 and the revolution of the cam drum 45. Links 60, 61 support a bearing 62 for intermediate gear 56. Bearing 62 is adjustable for different center distances, and a screw 63 and nut 64 are provided for adjusting it along link 61.

As movement of cam drum 45, will eventually move the reel support 19 with relation to carriage 13 an amount equal to the length of track 40, requiring resetting of the apparatus, bearing 43 is slideably mounted in box 44 for movement into and out of mesh with the rack. A lever 65 is pivotally mounted on the box 44 and supports the bearing 43. The lever extends through an opening 66 in the box. This opening is stepped to provide a high step for holding the cam in mesh with its rack and a low step for holding the cam out of mesh and permitting manual sliding of the reel support to its initial position. The lever 65 may slide on its pivot to permit such lateral movement of the lever.

Operation of the apparatus is as follows: A drum 10 is mounted in the machine and sheet material is wrapped thereabout for receiving the winding of cord. A supply of cord is placed on the reel support and the end of the cord is attached to the drum 10. The reel support has been adjusted to the left as seen in Fig. 2 by lowering the lever 65 and manually shifting the reel support, then reengaging the cam with the rack. The machine is then started and the cord or wire is laid in close convolutions upon the drum until the cam 45 moves the rack 40 and with it the reel support abruptly by the amount of one tooth of the rack thereby shifting the cord guide along the drum by an amount equal to the pitch of the rack 40, thereby shifting the course of the winding while the cord guide rapidly traverses the drum by an amount equal to the pitch of the rack. Thereupon further close convolutions of cord or wire are again laid.

The apparatus provides positive spacing of the convolutions in any desired arrangement of bands of close convolutions and intervening wide spaces, while positive guiding of the cord or wire is accomplished at all times, and the abrupt shifting of the winding between groups avoids objectionably gradual emergence of a cord end at the side of the belt body after severing the latter from the material on the drum. Also resetting is accomplished without difficulty.

Variations may be made without departing from the scope of the invention as it is defined by the following claims.

I claim:

1. Apparatus for making belts, said apparatus comprising a rotatable drum, means for rotating the drum, means for guiding a belt tension-resisting element to said drum, carriage means for continuously moving the guiding means axially of the drum to wind the belt tension-resisting element in uniform convolutions, means on said carriage means for abruptly advancing the guiding means with relation to the carriage means at regular intervals for spacing groups of convolutions from each other, and means for locking the carriage means and the guiding means against relative movement during the winding of said uniform convolutions, said means for advancing the guiding means with relation to the carriage means comprising a rack on said guiding means, a cam on said carriage means engaging said rack, and means for rotating said cam.

2. Apparatus for making belts, said apparatus comprising a rotatable drum, means for rotating the drum, means for guiding a belt tension-resisting element to said drum, carriage means for continuously moving the guiding means axially of the drum to wind the belt tension-resisting element in uniform convolutions, means for abruptly advancing the guiding means with relation to the carriage means at regular intervals for spacing groups of convolutions from each other, and means for locking the carriage means and the guiding means against relative movement during the winding of said uniform convolutions, said means for advancing the guiding means with relation to the carriage means and locking it thereto comprising a rack on said guiding means, a cam drum on said carriage having circumferential locking ribs engaging between teeth of said rack, and means for rotating said cam, said locking ribs being arranged in circumferentially spaced-apart sets in successive angular portions of the periphery of the drum, and having inclined cam faces on their ends for engaging inclined ends of the teeth of said rack for shifting said rack.

3. Apparatus for making belts, said apparatus comprising a rotatable drum, means for rotating the drum, means for guiding a belt tension-resisting element to said drum, carriage means for continuously moving the guiding means axially of the drum to wind the belt tension-resisting element in uniform convolutions, means for abruptly advancing the guiding means with relation to the carriage means at regular intervals for spacing groups of convolutions from each other, and means for locking the carriage means and the guiding means against relative movement during the winding of said uniform convolutions, said means for advancing the guiding means with relation to the carriage means and locking it thereto comprising a rack on said guiding means, a cam drum on said carriage having circumferential locking ribs engaging between teeth of said rack, and means for rotating said cam, said locking ribs being arranged in circumferentially spaced apart sets in successive angular portions of the periphery of the drum, and having inclined cam faces on their ends for engaging inclined ends of the teeth of said rack for shifting said rack, and means for moving said rack and said cam drum out of contact with each other to permit manual adjustment thereof.

ROBERT E. LINDEMANN.

REFERENCES CITED

The following references are of record in the file of this patent:

UNITED STATES PATENTS

| Number | Name | Date |
|---|---|---|
| 923,563 | McCornack | June 1, 1909 |
| 1,975,620 | Saul | Oct. 2, 1934 |